(12) United States Patent
Robb et al.

(10) Patent No.: US 7,093,125 B2
(45) Date of Patent: Aug. 15, 2006

(54) ROTE BASED TOOL DELEGATION

(75) Inventors: Mary Thomas Robb, Fort Collins, CO (US); Richard D. Harrah, Seattle, WA (US); Jeffrey R. Finz, Portland, OR (US); Humberto A. Sanchez, II, Fort Collins, CO (US); Douglas P. Drees, Fort Collins, CO (US); Terence E. Lister, Fort Collins, CO (US); Paula Curtis, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 09/850,793

(22) Filed: May 8, 2001

(65) Prior Publication Data
US 2002/0169956 A1     Nov. 14, 2002

(51) Int. Cl.
*H04L 9/00* (2006.01)
*H04L 9/32* (2006.01)
*H04K 1/00* (2006.01)
*G06F 7/04* (2006.01)
*G06F 17/30* (2006.01)
*G06K 9/00* (2006.01)

(52) U.S. Cl. ............... 713/166; 713/164; 713/165; 726/26; 726/27; 726/28

(58) Field of Classification Search ............ 713/166, 713/200
See application file for complete search history.

(56) References Cited

U.S. PATENT DOCUMENTS 6,023,765 A * 2/2000 Kuhn .................. 713/200

* cited by examiner

*Primary Examiner*—Gilberto Barrón, Jr.
*Assistant Examiner*—Benjamin E. Lanier

(57) ABSTRACT

A method and apparatus for delegating root access to non-root users of a computer system while maintaining computer system security are disclosed. Such a method may include authorizing a role for a user, wherein the authorized role includes one or more tools and the tools enable root access for certain tasks that the tools perform when run, whereby the one or more tools are delegated to the user and authorizing a machine of the computer system for the authorized role, wherein the computer system comprises a plurality of machines and the user is enabled to utilize the authorized role only on authorized machines, whereby utilizing the authorized role comprises running the one or more tools of the authorized role. Embodiments of the invention may comprise authorization objects that comprise attributes identifying a user and the roles and machine for which the user is authorized.

20 Claims, 4 Drawing Sheets

ROTE BASED TOOL DELEGATION

FIELD OF THE INVENTION

The technical field generally relates to network system security, and particularly relates to administrators' delegation of high-level permissions to multiple users.

BACKGROUND

In many computer systems, there is often a restricted class of users (e.g., root users) that have read and write access (e.g., root access) to the computer systems. These users are often the overall administrators of the computer systems. As such, these users often have a large number of responsibilities that prevent them from being able to efficiently perform everyday tasks (e.g., managing databases, websites, adding new users, etc.) on the machines of the computer systems. Somehow, these users must delegate their system access to other users.

Unfortunately, in these computer systems, access is limited to either all or nothing. In other words, a root user may delegate complete and total access to a non-root user or none at all. As a result, even if a root user wants to enable a non-root user only to be able to add users or administer a database on a single machine in the computer system, the non-root user will have total access to the computer system and be able to do most anything on the computer system. Clearly, this presents a significant problem with regard to computer system security.

One possible solution has been to limit the delegation of total access to non-root users to a discrete period of time. This solution enables the non-root user to perform an assigned task during the discrete period of time. Unfortunately, this solution is not satisfactory since the non-root user will still have complete computer system access, jeopardizing computer system security, for the discrete period of time.

The Hewlett Packard Company does provide a product called Systems Administration Manager ("SAM") that provides a "restricted" SAM access functionality (see U.S. Pat. Ser. No. 5,579,478). Likewise, there is a public domain UNIX tool called "sudo" which provides an ability to run commands as root on a per command basis. However, unlike the present invention, these tools are focused on a single system, do not allow access control across multiple systems (e.g., nodes), do not provide role-based tool delegation, and do not allow the degree of control that the present invention does, among other disadvantages.

Consequently, a system and method of enabling non-root users to perform specific tasks without jeopardizing computer system security is needed. A system and method for restricting non-root users' root access to delineated tasks preferably on specific machines or groups of machines is needed. A system and method of allocating tools that may be executed by non-root users for specific purposes based on user roles is needed.

SUMMARY

A method and apparatus delegate root access to non-root users of a computer system while maintaining computer system security. An embodiment comprises a system and method for allocating tools, which may be executed by non-root users to perform previously root-only tasks, based on roles that users are authorized to utilize. Root users or other users that have been authorized to create roles and tools preferably create the roles and tools. The non-root users are preferably authorized to utilize the roles on specific machines or groups of machines (e.g., nodes or node groups). In an embodiment, objects represent the users, roles, tools and machines and the users' authorizations to utilize the roles on machines (and therefore, the role-based tool delegation) are represented by authorization objects. In an embodiment utilizing objects, the objects may be Java objects that are instantiated Java classes running in a Java Virtual Machine. The Java objects are preferably resident in a computer memory while they are running.

These and other advantages are achieved by a method for delegating root access to non-root users of a computer system while maintaining computer system security, wherein root access permits reading and writing of files in the computer system and the computer system comprises a plurality of machines, the method comprising authorizing a role for a user, the authorized role comprising one or more tools that are executables that enable root access for certain tasks that the tools perform when executed, whereby the one or more tools are delegated to the user, and authorizing a machine of the computer system for the authorized role, wherein the user is enabled to utilize the authorized role only on authorized machines, whereby utilizing the authorized role comprises executing the one or more tools of the authorized role.

Likewise, these and other advantages are achieved by a computer readable medium containing instructions for delegating root access to non-root users of a computer system while maintaining computer system security, wherein root access permits reading and writing of files in the computer system and the computer system comprises a plurality of machines, by authorizing a role for a user, the authorized role comprising one or more tools that are executables that enable root access for certain tasks that the tools perform when executed, whereby the one or more tools are delegated to the user, and authorizing a machine of the computer system for the authorized role, wherein the user is enabled to utilize the authorized role only on authorized machines, whereby utilizing the authorized role comprises executing the one or more tools of the authorized role.

Further, these and other advantages are achieved by a method for delegating root access to non-root users of a computer system while maintaining computer system security, wherein root access permits reading and writing of files in the computer system and wherein the computer system comprises a plurality of nodes, the method comprising creating an authorization object for the user, wherein the authorization object comprises a plurality of attributes, populating one of the authorization object attributes with data identifying an authorized role, wherein roles comprise one or more tools that are executables that enable root access for certain tasks that the tools perform when executed, whereby the one or more tools are delegated to the user, and populating one of the authorization object attributes with data identifying an authorized node of the computer system, wherein the user is enabled to utilize the role only on authorized nodes, whereby utilizing the authorized role comprises executing the one or more tools of the authorized role.

BRIEF DESCRIPTION OF THE FIGURES

The detailed description will refer to the following drawings, in which like numbers refer to like items, and in which.

DETAILED DESCRIPTION OF PREFERRED EMBODIMENTS

Figure 1:
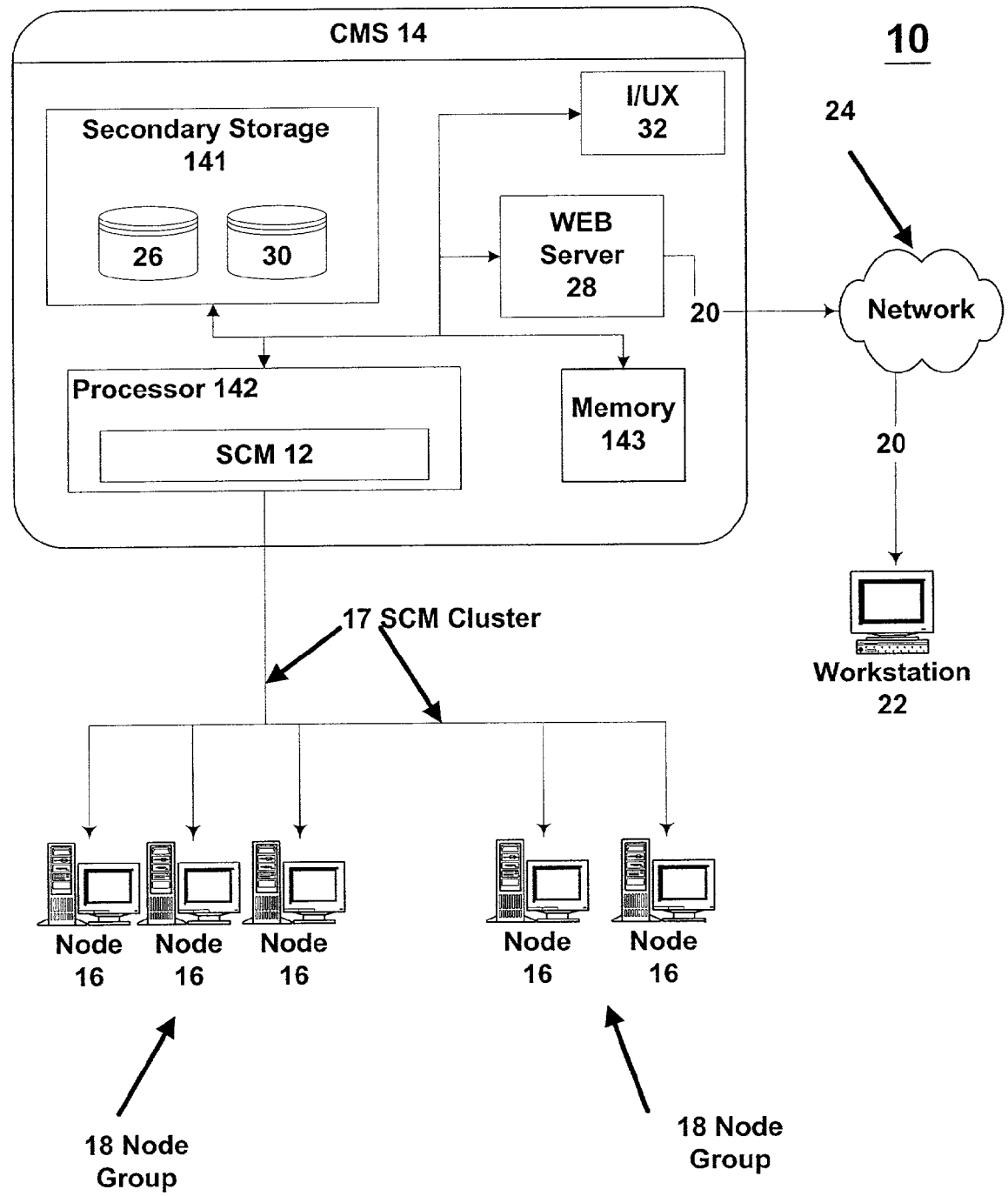
FIG. 1 is a block diagram of a network system in which an embodiment of role-based tool delegation is used.

The role-based tool delegation may be used with network computer systems in which it is necessary to secure the system and in which only a restricted class of users (e.g., root users) have complete read and write access to the system. FIG. 1 illustrates such a computer system 10 with which therole-based tool delegation may be used. The computer system 10 comprises a ServiceControl Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18.

The CMS 14 preferably is an HP-UX 11.x server running the SCM 12 software. The CMS 14 includes a memory 143, a secondary storage device 141, a processor 142, an input device (not shown), a display device (not shown), and an output device (not shown). The memory 143, a computer readable medium, may include RAM or similar types of memory, and the memory 143 may store one or more applications for execution by processor 142, including the SCM 12 software. The secondary storage device 141, a computer readable medium, may include a hard disk drive, floppy disk drive, CD-ROM drive, or other types of non-volatile data storage. The processor 142 executes the SCM 12 software and other application(s), which are stored in memory 143 or secondary storage 141, or received from the Internet or other network 24, in order to provide the functions and perform the methods described in this specification, and the processing may be implemented in software, such as software modules, for execution by the CMS 14 and nodes 16. The SCM 12 is programmed in Java® and operates in a Java environment. See *ServiceControl Manager Technical Reference, HP® part number:* B8339-90019, available from Hewlett-Packard Company, Palo Alto, Calif., which is hereby incorporated by reference, for a more detailed description of the SCM 12. The *ServiceControl Manager Technical Reference, HP® part number:* B8339-90019 is also accessible at http://www.software.hp.com/products/scmgr.

Generally, the SCM 12 supports managing a single SCM cluster 18 from a single CMS 14. All tasks performed on the SCM cluster 18 are initiated on the CMS 14 either directly or remotely, for example, by reaching the CMS 14 via a web connection 20. Therefore, a workstation 22 at which a user sits only needs the web connection 20 over a network 24 to the CMS 14 (or a managed node 16) in order to perform tasks on the SCM cluster 18. The user may access the CMS 14 and the SCM cluster 18 from a workstation through command line interfaces ("CLIs") or graphical user interfaces ("GUIs") (not shown). In addition to the SCM 12 software and the HP-UX server described above, the CMS 14 preferably also comprises a data repository 26 for the SCM cluster 17, a web server 28 that allows web access to the SCM 12 and a depot 30 comprising products used in the configuring of nodes, and a I/UX server 32.

The nodes 16 are preferably HP-UX servers or other servers and they may be referred to as "managed nodes" or simply as "nodes". Conceptually, a node 16 represents a single instance of HP-UX running on a hardware device.

The node 16 may comprise (not shown) a memory, a secondary storage device, a processor, an input device, a display device, and an output device. The SCM 12 is designed to manage single node HP-UX systems such as the N Class as well as the separate protection domains in a SuperDome™.

The CMS 14 itself is preferably also a managed node 16, so that multi-system aware ("MSA") tools can be invoked on the CMS 14. All other nodes 16 are preferably explicitly added to a SCM cluster 18. Generally, user access to SCM 12 files is delineated to root users, who have permission to read, write, and execute files and non-root users, who have limited access to files (e.g., only execute).

Although the CMS 14 is depicted with various components, one skilled in the art will appreciate that this server can contain additional or different components. In addition, although aspects of an implementation are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 to perform a particular method, such as those described herein.

The SCM 12 is preferably an object-oriented programming application. Object-oriented programming is a method of programming that pairs programming tasks and data into re-usable chunks known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked.

Some objects and classes discussed herein are named with a prefix "mx". The mx prefix is indicative of the application utilizing the objects and classes (e.g., the SCM 12), and is merely exemplary. The names of classes, objects, methods and functions discussed herein are exemplary, are not intended to be limiting, and are merely used for ease of discussion. The terms function and method are used interchangeably herein.

Generally, user access to SCM 12 files is delineated to root users, who have permission to read, write, and execute files and non-root users, who may have limited access to files (e.g., only execute).

Figure 2:
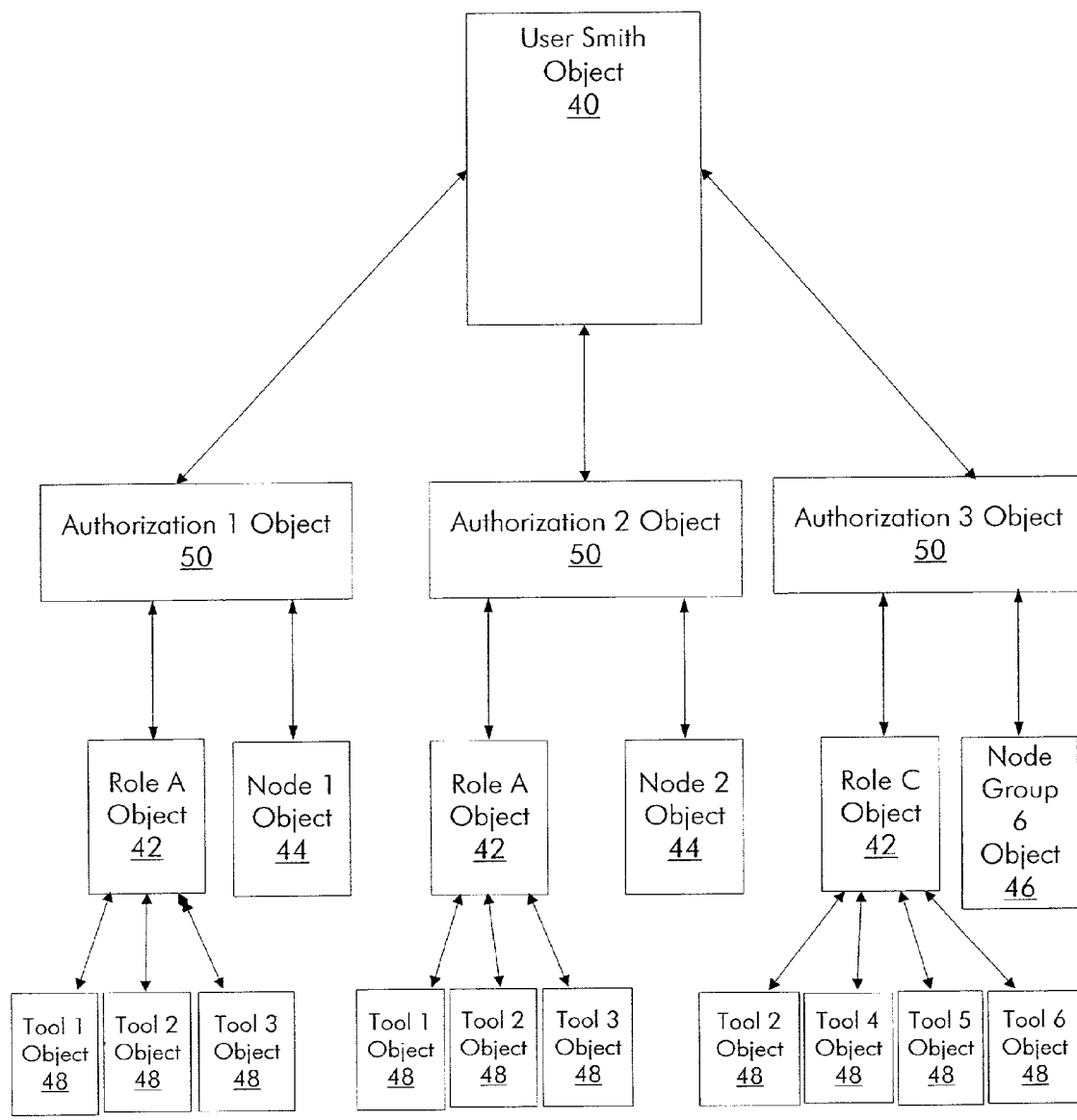
FIG. 2 is a block diagram conceptually illustrating components of an embodiment of role-based tool delegation.

In an embodiment, conceptually illustrated in FIG. 2, root users allocate permissions to read, write, and execute files to non-root users. Roles comprise certain delineated tasks (e.g., delete a file, write to a file, add a user to the operating system and, modify a database entry) that non-root users are authorized to perform on authorized machines (e.g., nodes 16) for a specific purpose. A tool is an executable that performs a process. The tools define the delineated tasks of the roles and comprise coding necessary to perform the tasks. The tools are created for each of the tasks and are then assigned to a role or roles in order to fulfill the purposes of the role or roles. Once a role is created with assigned tools, the role may be authorized for a user to use on one or more machines. An authorization defines the node(s) and node group(s) that the user is authorized to access and what roles the user has on the authorized node(s) or node group(s). Through this authorization, the tools are allocated to users based on authorized roles.

An example of a newly created role may be a "database administrator" role. A database administrator may need to be able to perform tasks such as adding database entries, deleting database entries, modifying database entries, compiling database entries, and searching database entries. Accordingly, tools that perform these tasks would be created and assigned to the new database administrator role. Certain tools may be useful in a plurality of roles, and therefore, would be assigned to the plurality of roles. Likewise, when a new role is created, existing tools that define and perform the necessary tasks may be assigned to the new role.

Roles are authorized for use in order to allocate tools to the user. The tools to which a role is assigned may give the users root access to a system for a narrow, limited purpose on certain machines (e.g., nodes 16). Note that some tools may not provide root access. Continuing with the previous example, the newly created database administrator role may be authorized for a user "Smith" to use on a node 16 named "NODE1". Consequently, the user Smith has the role database administrator on NODE1 and may execute the tools delegated to the user Smith based on the database administrator role on NODE1. In this example, the user Smith does not have the database administrator role on any other node 16, and therefore, cannot execute the tools of the database administrator role on any other node 16 (such as a node 16 named "NODE2"). Likewise, the user Smith only has the database administrator role on NODE1, and therefore, cannot execute any tools, other than those of the database administrator role, on NODE1.

As illustrated in FIG. 2, users may be authorized to use a role on more than one machine. Likewise, users may be authorized for more than one role. FIG. 2 depicts a user object 40, which represents a user and includes attributes that describe the user. The user object 40, and other objects described herein, may be Java objects that are instantiated Java classes running in a Java Virtual Machine on the system 10 described above. When the SCM 12 is running, the user object 40 and the other objects may be resident in the memory of the CMS 14.

FIG. 2 further illustrates role objects 42, which represent roles for which the user is authorized, node objects 44, which represent the nodes 16 on which the user may utilize the roles, and node groups 46, which represent the node groups 18 on which the user may utilize the roles. Each role object 42 may be assigned to one or more tools (a tool may also be considered to be assigned to a role). Therefore, FIG. 2 also shows tool objects 48, which represent the tools assigned to the various roles and which are delegated to the user represented by the user object 40 based on the authorized roles.

A user's authorization to utilize various roles and their tools on certain nodes 16 or node groups 18 may be maintained by authorization objects 50. Accordingly, FIG. 2 also illustrates authorization objects 50, which define the roles and nodes 16 and/or node groups 18 for which the user is authorized. In an embodiment, authorization objects 50 for each role and node or node group for which a user is authorized may be created. Since these authorization objects 50 link a user to a role and a node 16 or node group 18, the authorization objects 50 may be referred to as authorization "triplets".

The objects shown in FIG. 2 may be accessed and managed by software components referred to as object managers (not shown). In the computer system 10 (see FIG. 1), the object managers may be components of the SCM 12 that run on the CMS 14. For example, the authorization objects 50, the tool objects 48, the node group objects 46, node objects 44, role objects 42 and user objects may be accessed and managed by a security manager, a tool manager, node group manager, node manager, role manager and user manager, respectively. In the computer system 10, a method of the role manager may be invoked to get (e.g., retrieve and instantiate) a role object 42, for example, in order to get or set an attribute of the role object 42. If an attribute of the role object 42 is set (e.g., modified), the role object 42 may be returned to the role manager in order to persist the modification (e.g., store the modified role object). Object manager methods are preferably invoked via remote method invocations ("RMIs").

Figure 3A:
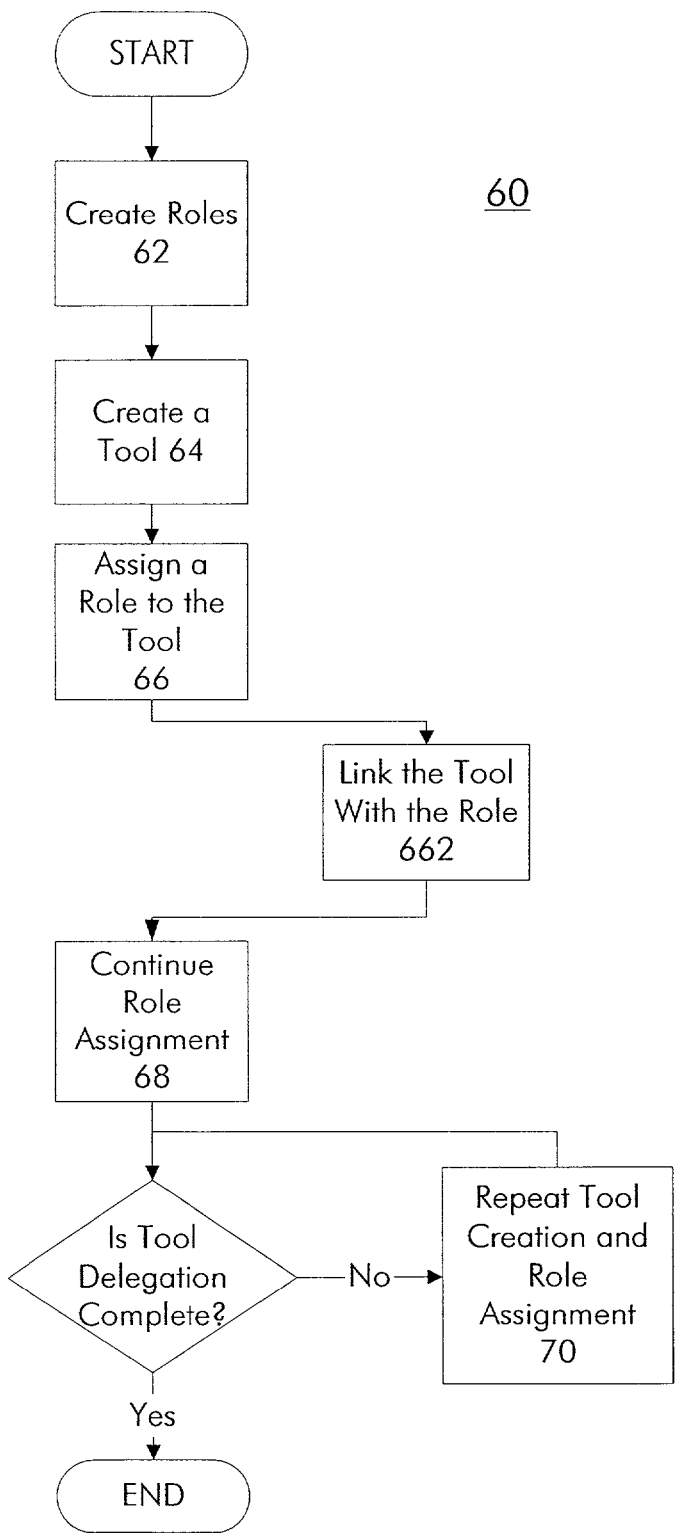
FIGS. 3a and 3b are flowcharts illustrating a method for role-based tool delegation.
Figure 3B:
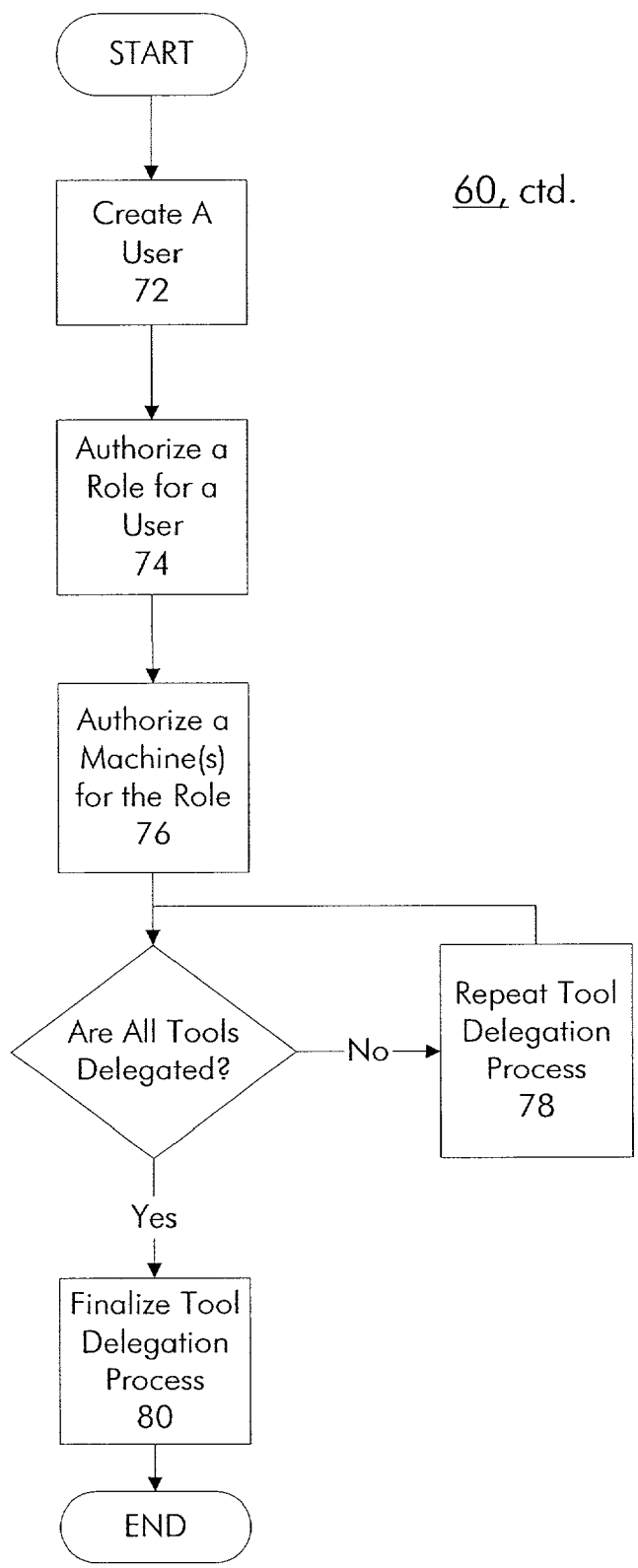

FIGS. 3a and 3b are flowcharts illustrating a method 60 for role-based tool delegation. FIG. 3a illustrates a part of the method 60 comprising the creation of roles and assigning of roles to tools. As shown in FIG. 3a, the method 60 may comprise creating roles 62, creating a tool 64, assigning a role to the tool 66, continuing role assignment 68 and repeating tool creation and role assignment until tool delegation is complete 70. Creating roles 62 preferably comprises determining what roles are needed and what tasks a user with each role may perform, and defining the roles. What roles are needed may be determined by the computer system on which the roles are created and the jobs that a root user decides delegate to non-root users to perform. For example, if the computer system (e.g., the computer system 10 shown in FIG. 1) included databases on a plurality of machines (e.g., nodes 16), one such job that a root user may decide to delegate to non-root users is database administrator. Delegating database administrator jobs, and other lower-level, time-intensive jobs, to non-root users allows the root user to concentrate on more important things (e.g., maintaining system security) and the computer system to be more efficiently run.

Requirements for fulfilling the jobs for which the roles are created help determine the tasks that a user with each role may perform. For example, a database administrator may need to add entries, modify entries, delete entries, search entries, compile data from the entries, etc. Defining the roles may comprise describing the job each role is intended to fulfill and the tasks that may be performed by a user with each role. In an embodiment (e.g., as a role of the SCM 12), the role may be created as a role object 42 that includes code and attributes that define the role. The tasks that a user with each role may perform determine which tools are allocated to which roles.

Creating a tool 64 preferably comprises determining a task to be performed by the tool and writing code that defines the task and the parameters of the tool and that is executed when the tool is invoked to perform the task. For example, the task may be copying a file. In order to copy a file, the file, the location of the file and the target location for the copy of the file must be identified. Accordingly, code to perform a file copying operation and that defines the tool parameters as the file, the location of the file and the target location for the copy of the file is written to create the tool. In an embodiment (e.g., as a tool of the SCM 12), the tool may be created as a tool object 48 that includes the code and attributes that define the operation performed by the tool and the tool parameters.

Assigning a role to the tool 66 preferably comprises determining that the tool fulfills one of the created role's tasks and linking 662 the tool with the role. Generally, a role is assigned to the tool when the role is created. Indeed, a tool may be created to fulfill a task determined to be necessary for a specific role. However, the order of these steps is not critical, other than that a role cannot be assigned to a tool until both the tool and role have been created.

Linking 662 the tool with the role may comprise writing code that links the tool with the role so that a user authorized to utilize the role will be able to execute the tool. As noted above, in an embodiment, the tool and the roles may be objects. Linking 662 the tool with the role may comprise populating an attribute of the tool object 58 with data that identifies the role. Populating attributes of the tool object 48 may be accomplished by invoking mutator methods (e.g., set methods) of the tool object 48. This linking enables the computer system (e.g., computer system 10) to confirm that a user authorized to utilize the role may execute the tool or tools assigned to the role.

Continuing role assignment 68 reflects the fact that a tool may be assigned a plurality of roles (or, the tool may be considered to be assigned or allocated to a number of roles). Tools may perform tasks that are necessary for a plurality of roles. For example, two (or more) roles may require that a user authorized to utilize the roles be able to add new users. Accordingly, a tool that enables the adding of new users is allocated to both of these roles. Continuing role assignment 68 therefore may comprise repeating step 66 until no more roles need to be assigned to the tool.

Repeating tool creation and role assignment 70 until tool delegation is complete may comprise creating additional tools and assigning role(s) to the additional tools until a tool is linked to each role for each task of each role. Accordingly, repeating tool creation and assignment 70 until tool delegation is complete preferably comprises repeating steps 64 through 68 until this condition is met, as shown in FIG. 3a.

From the above, it may appear that multiple roles are created, a single tool is created at a time, the tool is assigned one or more roles and the process is repeated until all of the roles are linked with the necessary tools. Indeed, these steps represent an exemplary process of creating tools and roles and assigning tools to roles. In another embodiment, the process may be implemented by, for example, creating a plurality of tools with a single role created at a time, the tools allocated to the role until the role is linked with all the necessary tools, and the process repeated for any additional roles necessary. Tools may be created well in advance of the creation of a new role, so that the role is created with old, pre-existing tools. Moreover, a new tool may be created when a role is created when a role creator determines that a new tool is needed to perform a task of the role. In other words, the process described above (with reference to FIG. 3a) is a dynamic process that is not restricted by temporal limitations.

Once a role has been created and tools allocated to the role, a user may be authorized to utilize the role on one or more machines (e.g., a node 16 or node group 18). Through this role-based authorization, tools are delegated to users. Accordingly, FIG. 3b illustrates the continuation of the method 60 for role-based tool delegation. As shown, the method 60 comprises creating a user 72, authorizing a role for a user 74, authorizing a machine or machines for the authorized role 76, repeating tool delegation process 78 and finalizing tool delegation process 80. The steps illustrated in FIG. 3b may be performed at any time after the steps shown in FIG. 3a.

Creating a user 72 may comprise adding a new user to the SCM 12 on which the roles and tools are created. Adding a new user may comprise entering information that identifies the user. Indeed, the delegation process described below may be considered as part of creating a user 72. As noted above, in a preferred embodiment, the user may be created as a user object 40 (e.g., as a user of the SCM 12) that includes attributes that define and describe the user. The user object 40 may include attributes that identify the roles and nodes that for which the user is authorized.

Authorizing a role for a user 74 may comprise determining that a user will have a certain role (e.g., a trusted user, database administrator) on the computer system (e.g., computer system 10) and linking the role with the user so that the user can utilize the role and run the role's tools. When a user is created, the root user, or a user with a role (e.g., trusted user or supervisor) that enables the adding of users and authorizations of roles, may be adding the user for a specific purpose, such as administering a database on a certain machine or administering a Web-site hosted by a certain machine. As such, the root user, trusted user and/or supervisor may determine that the new user will have a database administrator or Web-site administrator role.

Alternatively, the root user, trusted user and/or supervisor may determine what tools the new user will need to be delegated in order to fulfill a certain purpose or accomplish certain tasks. These tools may determine what role the user will be authorized. If the tools are not found within an existing role, a new role may be created, according to the process described above with reference to FIG. 3a. Once it has been determined that a user will have a certain role, that role is preferably linked to the user so that the user is authorized to execute the role's tools.

In a preferred embodiment, a user's authorization for a role is created as an authorization object 50 (e.g., as an authorization object of the SCM 12) that is linked to the user object 40 and that indicates that a user is authorized to utilize the role and tools to which the role is assigned, thereby allocating the assigned tools to the user. In this embodiment, authorizing a role for the user 74 preferably comprises creating an authorization object 50 that comprises a plurality of attributes, and populating one of the attributes with data identifying the role (e.g., data identifying a role object 42, such as a role object 42 name). Mutator methods (e.g., set methods) of the authorization object 50 may be invoked in order to populate the attributes of the authorization object 50.

In a preferred embodiment, a user is authorized to utilize a role on a specific machine or machines. Accordingly, authorizing a machine or machines for the authorized role 76 comprises determining on which machine or machines (e.g., node 16, nodes 16, and/or node groups 18) the user will utilize the role and linking the user's role authorization to the determined machine or machines. In a preferred embodiment, a user's authorization for utilizing a role on a machine or machines (e.g., on a node 16, nodes 16 or node group 18) is created as an authorization object 50 (e.g., as an authorization object of the SCM 12) that is linked to the user object 40 and that indicates that a user is authorized to utilize a role and the role's assigned tools on the machine. In such an embodiment, authorizing a machine for the authorized role 76 may comprise populating one of the attributes of the authorization object 50 with data identifying the authorized machine (e.g., data identifying a node object 44, such as a node object 44 name).

Additional tools may be delegated to the user beyond those delegated by the authorized role. Accordingly, repeating the tool delegation process 78 may comprise repeating authorizing a role 74 and authorizing a machine or machines for the authorized role 76. Repeating the tool delegation process 78 may continue until all the tools determined to be delegated to the user are delegated to the user, and therefore, until all the necessary roles and nodes are authorized for the user.

Finalizing the tool delegation process 80 may comprise saving the authorizations created as described above. For example, in a preferred embodiment in which the authorizations are created as authorization objects 50, finalizing the tool delegation process 80 comprises saving the authorization objects 50. In the computer system 10, the authorization objects 50 may be stored in the repository 26 on the CMS 14, from which they may be accessed by an authorization manager component of the SCM 12.

A root user, or a user with the role enabling privilege for the modification of authorization objects 50, may access the authorization objects 50 via the security manager and modify the attributes of the authorization objects 50 in order to add nodes 16 or node groups 18 on which users are authorized to utilize the role. Likewise, the user objects 40, role objects 42, and tool objects 48 may be stored in the repository 26 and accessed via user manager, role manager and tool manager components of the SCM 12 by a root user or a user with a sufficient SCM privileges to modify roles, tools or to create new authorizations for users.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method for delegating root access to non-root users of a computer system while maintaining computer system security, wherein root access permits reading and writing of files in the computer system and the computer system comprises a plurality of machines, the method comprising:
   authorizing a role for a user, the authorized role comprising one or more tools that are executables that enable root access, wherein the one or more tools are delegated to the user, and wherein the one or more tools are executables that perform one or more tasks uniquely assigned to each user based on the authorized role and include code to perform the one or more tasks; and
   authorizing a machine of the computer system for the authorized role, wherein the user is enabled to utilize the authorized role only on authorized machines, whereby utilizing the authorized role comprises executing the one or more tools of the authorized role.

2. The method of claim 1, wherein step b) is repeated for one or more additional machines.

3. The method of claim 1, wherein steps a) and b) are repeated for one or more additional roles.

4. The method of claim 1, wherein authorizing a role for a user comprises:
   creating an authorization object for the user, wherein the authorization object comprises a plurality of attributes; and
   populating one of the authorization object attributes with data identifying the authorized role.

5. The method of claim 4, wherein a role object represents the authorized role and the data identifying the authorized role comprises data identifying the role object.

6. The method of claim 5, wherein tool objects represent tools and the tool objects comprises attributes populated with data identifying the role object.

7. The method of claim 4, wherein authorizing a machine of the computer system for the authorized role comprises:
   populating one of the authorization object attributes with data identifying the machine.

8. The method of claim 7, wherein a machine object represents the machine and the data identifying the machine comprises data identifying the machine object.

9. The method of claim 7, wherein a user object represents the user, the method further comprising:
   creating the user object, wherein the user object comprise attributes; and
   populating one of the authorization object attributes with data identifying the user object.

10. The method of claim 1, wherein the machine is a node.

11. A computer readable medium containing instructions for delegating root access to non-root users of a computer system while maintaining computer system security, wherein root access permits reading and writing of files in the computer system and the computer system comprises a plurality of machines, by:
    authorizing a role for a user, the authorized role comprising one or more tools that are executables that enable root access, wherein the one or more tools are delegated to the user, and wherein the one or more tools are executables that perform one or more tasks uniquely assigned to each user based on the authorized role and include code to perform the one or more tasks; and
    authorizing a machine of the computer system for the authorized role, wherein the user is enabled to utilize the authorized role only on authorized machines, whereby utilizing the authorized role comprises executing the one or more tools of the authorized role.

12. The computer readable medium of claim 11, wherein authorizing a role for a user comprises:
    creating an authorization object for the user, wherein the authorization object comprises a plurality of attributes; and
    populating one of the authorization object attributes with data identifying the authorized role.

13. The computer readable medium of claim 12, wherein a role object represents the authorized role and the data identifying the authorized role comprises data identifying the role object.

14. The computer readable medium of claim 13, wherein tool objects represent tools and the tool objects comprise attributes populated with data identifying the role object.

15. The computer readable medium of claim 12, wherein authorizing a machine of the computer system for the authorized role comprises:
    populating one of the authorization object attributes with data identifying the machine.

16. The computer readable medium of claim 15, wherein a machine object represents the machine and the data identifying the machine comprises data identifying the machine object.

17. The computer readable medium of claim 15, wherein a user object represents the user, and wherein the instructions further delegate root access to non-root users of a computer system while maintaining computer system security by:
    creating the user object, wherein the user object comprises attributes; and
    populating one of the authorization object attributes with data identifying the user object.

18. A method for delegating root access to non-root users of a computer system while maintaining computer system security, wherein the root access permits reading and writing of files in the computer system and wherein the computer system comprises a plurality of nodes, the method comprising:

creating an authorization object for the user, wherein the authorization object comprises a plurality of attributes;

populating one of the authorization object attributes with data identifying an authorized role, wherein roles comprise one or more tools that are executables that enable root access for certain tasks that the tools perform when executed, wherein the one or more tools are executables that perform one or more tasks uniquely assigned to each user based on the authorized role include code to perform the tasks; and populating one of the authorization object attributes with data identifying an authorized node of the computer system, wherein the user is enabled to utilize the role only on authorized nodes, whereby utilizing the authorized role comprises executing the one or more tools of the authorized role.

19. The method of claim 18, wherein a role object represents the authorized role and the data identifying the authorized role comprises data identifying the role object and wherein a machine object represents the machine and the data identifying the machine comprises data identifying the machine object.

20. The method of claim 18, wherein a user object represents the user, the method further comprising:

creating the user object, wherein the user object comprises attributes; and populating one of the authorization object attributes with data identifying the user object.

* * * * *

UNITED STATES PATENT AND TRADEMARK OFFICE
CERTIFICATE OF CORRECTION

| | | |
|---|---|---|
| PATENT NO. | : 7,093,125 B2 | Page 1 of 1 |
| APPLICATION NO. | : 09/850793 | |
| DATED | : August 15, 2006 | |
| INVENTOR(S) | : Mary Thomas Robb et al. | |

It is certified that error appears in the above-identified patent and that said Letters Patent is hereby corrected as shown below:

On the face page, in field (54), in "Title", in column 1, line 1, delete "ROTE" and insert -- ROLE --, therefor.

In column 1, line 1, delete "ROTE" and insert -- ROLE --, therefor.

In column 11, line 15, in Claim 18, after "authorized role" insert -- and --.

Signed and Sealed this

Fifth Day of January, 2010

David J. Kappos
*Director of the United States Patent and Trademark Office*